May 21, 1940.  J. A. DERRIG  2,201,523
HYDRAULICALLY OPERATING BRAKING SYSTEM
Filed July 19, 1939
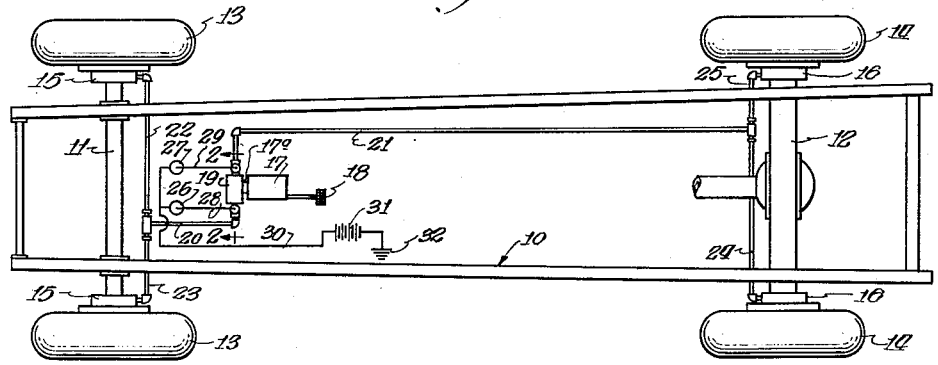
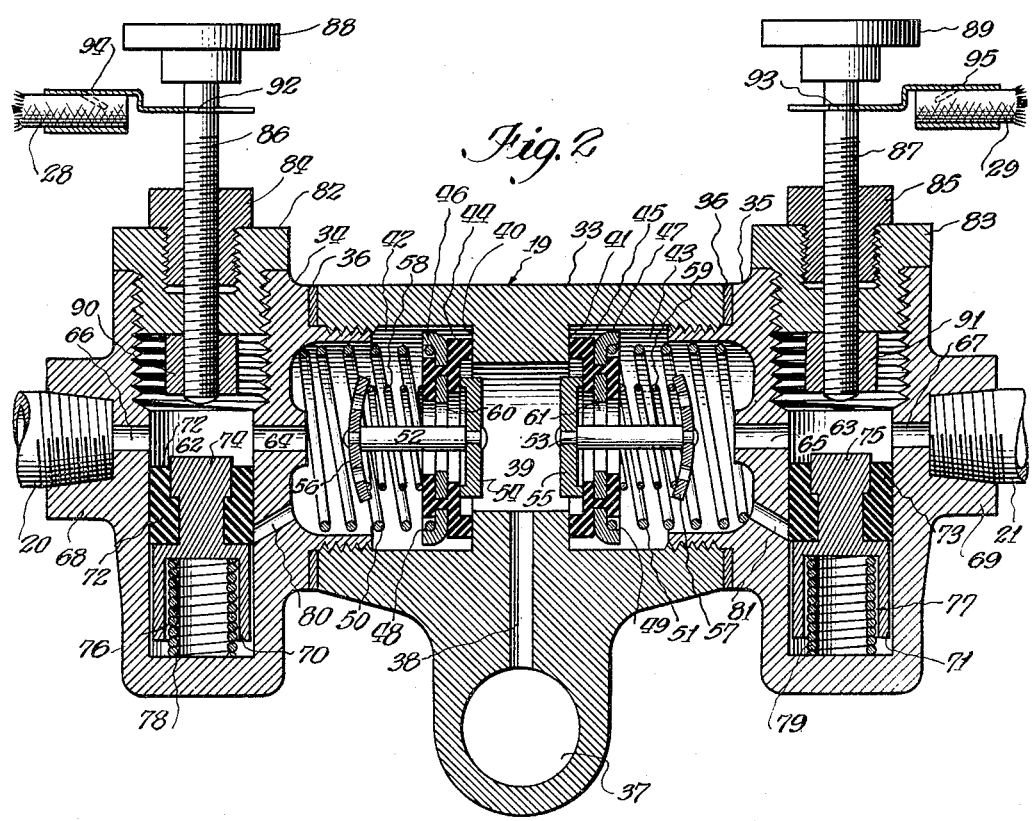
Inventor:
Joseph A. Derrig
By: Leslie W. Frieze
Attorney.

Patented May 21, 1940

2,201,523

UNITED STATES PATENT OFFICE 2,201,523

HYDRAULICALLY OPERATING BRAKING SYSTEM

Joseph A. Derrig, Mount Prospect, Ill.

Application July 19, 1939, Serial No. 285,331

12 Claims. (Cl. 303—84)

My invention relates to hydraulically operating braking systems of the type having safety means for cutting off fluid flow to one or more of the brake actuating devices of the system upon development of a leak or break in the fluid conduit leading to those brake actuating devices, and in particular my invention relates to safety devices of this type adapted to be installed in ordinary fluid braking systems of automotive vehicles.

Ordinary automotive fluid braking systems comprise a number of brake actuating devices, one for each brake, a fluid displacement mechanism, and a number of fluid conduits connecting the displacement mechanism with the brake actuating devices. One serious disadvantage of this type of braking system lies in the fact that a leak or break in one of the fluid conduits will allow the fluid in the whole system to drain out, thus rendering the entire braking system of the vehicle ineffective. It is apparent that such a failure might easily lead to a serious accident. Numerous safety devices and arrangements have been devised which, upon a leak or break in one of the conduits, cut off the defective conduit and the associated brake actuating devices from the fluid displacement mechanism of the system, thus leaving the other brakes of the system still effective. Some of these devices are adapted in addition to give a warning signal to the driver of the vehicle on one or more of the fluid conduits being cut off. However, the prior devices of this type have in general proved to be ineffective and unsatisfactory or else too expensive of manufacture.

It is accordingly an object of my invention to provide an improved safety device of this type which will reliably and effectively cut off a leaky or broken fluid conduit and simultaneously give a signal to the vehicle driver.

It is also an object of my invention to provide a device of this type which is inherently light in weight, which has a minimum number of moving parts, and which in general is of simple and inexpensive construction.

The invention consists of the novel constructions, arrangements and devices to be hereinafter described and claimed for carrying out the above stated objects and such other objects as will appear from the following description of a certain preferred embodiment illustrated in the accompanying drawing, wherein:

Fig. 1 is a plan view of the chassis of an automobile which has my improved safety device installed thereon; and Fig. 2 is a central vertical section on an enlarged scale of my improved safety device taken on line 2—2 of Fig. 1.

Like characters of reference designate like parts in the several views.

Referring now to the drawing, an automobile frame shown at 10 and forming a portion of the chassis has attached thereto a front axle 11 and a rear axle 12 carrying front and rear wheels 13 and 14, respectively. Attached to the wheels and axles are front brakes 15 and rear brakes 16, each of which comprises a brake actuating device of any suitable type. The brake actuating devices function to brake the wheels when fluid is forced into them, and upon decrease of fluid pressure the devices function to force the fluid back to its source.

A master cylinder or fluid displacement mechanism 17 is attached to the vehicle at a suitable place and has a pedal 18 connected therewith. My improved safety device 19 is connected with and is in communication with the master cylinder at its outlet end 17a, and connected to the safety device are fluid conduits or brake lines 20 and 21. Brake line 20 branches into lines 22 and 23 which lead to the individual front wheel brakes 15, and brake line 21 branches into lines 24 and 25 which lead to the individual rear wheel brakes 16.

Two signal lamps 26 and 27 are connected by means of electric leads 28 and 29 with my improved safety device 19, and the lamps are also connected by lead 30 with the storage battery 31 of the automobile. The storage battery is grounded to the chassis at 32 and the safety device 19 is also grounded to the chassis through the master cylinder 17 for establishing electric circuits for the lamps 26 and 27, as will be henceforth described. The lamps are mounted within sight of the automobile driver and preferably on the dash board of the car.

It is readily understood that a depression of the pedal 18 causes fluid to be displaced in the master cylinder 17 thus forcing it through the outlet end 17a of the master cylinder. The fluid displacement mechanism is provided with valve means at its outlet end which in addition to allowing fluid passage in and out of the mechanism also, when the brakes are in unapplied condition, maintains the fluid pressure between the safety device and the mechanism at a certain value, approximately seven pounds per square inch.

As shown in Fig. 2 my improved safety device 19 comprises a central casing portion 33 and two end casing portions 34 and 35 which are screwed into the central casing portion for securing them thereto. Gaskets 36 are provided between the casing portions as shown. The central casing portion 33 is provided with a longitudinally extending cylindrical port 37 for the inlet and outlet of fluid and a duct 38 communicating with the port. The casing portion 33 is provided with a cylindrical transversely extending hollow 39 and in its central region the hollow is of smaller diameter than at its ends, thus forming outwardly facing ledges 40 and 41. These ledges define, with the end casing portions 34 and 35, chambers 42 and 43. As shown, the duct 38 connects with the hollow 39.

Valve means are provided in chambers 42 and 43 comprising valve members 44 and 45 of rubber-like material carrying metal washer-like members 46 and 47 which at their outer peripheries and turned back, as shown, to provide spring seats 48 and 49. Springs 50 and 51 are seated in these seats and bear at their outer ends on the end casing portions 34 and 35. The arrangement is such that the valve members 44 and 45 are forced by the springs 50 and 51 against the ledges 40 and 41 which act as valve seats.

Shafts 52 and 53 pass through the washer-like members 46 and 47 and are provided with valve heads 54 and 55 at their inner ends which seat on the rubber-like members 44 and 45. On their outer ends the shafts are provided with spring retaining heads 56 and 57 against which springs 58 and 59 bear. At their inner ends the springs 58 and 59 bear on valve members 44 and 45 and are partially supported by the washer-like members 46 and 47. The arrangement is such that the valve heads 54 and 55 are drawn by the springs 58 and 59 against the rubber-like valve members 44 and 45. The shafts 52 and 53 fit loosely in the washer-like members 46 and 47 and each of these members are provided with a plurality of perforations 60 and 61 therethrough for purposes hereinafter described.

The end casing portions 34 and 35 are provided with internal cylindrical chambers 62 and 63. Passages 64 and 65 connect the chambers 42 and 43 with the chambers 62 and 63, and passages or outlet ports 66 and 67 connect the chambers 62 and 63 with the conduits 20 and 21 which are screw-threaded into sockets 68 and 69 of the end casing portions. In the chambers 62 and 63 are positioned plungers or pistons 70 and 71 carrying on their top ends sleeves 72 and 73 of rubber or the like. The plungers fit loosely in the chambers 62 and 63 while the sleeves fit tightly therein. The plungers are provided on their top ends with contact portions 74 and 75 and are provided on their bottom ends with cavities 76 and 77 adapted to receive springs 78 and 79 which act to force the plungers upwardly in their corresponding chambers. Ducts 80 and 81 are provided in the end casing portions leading from chambers 42 and 43 and terminating in chambers 62 and 63 immediately above the lowermost portions of the sleeves when the sleeves and plungers are in normal position as in the figure.

The chambers 62 and 63 are closed at their top ends by caps 82 and 83 of insulating material which are screwed into the chambers. Packing nuts 84 and 85 are in turn screwed into the caps 82 and 83 and carry screw-threaded stems 86 and 87. The stems have permanently fastened thereto at their top ends adjusting heads 88 and 89 and at their lower ends sleeves 90 and 91 which act to limit the upward movement of the stems. The stems are provided adjacent their tops with grooves 92 and 93 which receive the bifurcated spring clips 94 and 95 terminating the wires 28 and 29.

The safety device is preferably fastened to the end 17a of the master cylinder by means of a threaded stud (not shown) which is screwed into the cylinder and through the port 37 of the device. The stud is provided with an internal bore communicating with the inside of the cylinder and is provided with an outlet port which communicates with the duct 38. It is apparent that my improved safety device may be easily connected in the braking system of an otherwise completed automobile simply by disconnecting the lines 20 and 21 from the master cylinder 17 and connecting the safety device therebetween.

It should be noted that, assuming the valve members 44 and 45 are out of contact with the valve seats 40 and 41, there is in effect a fluid conduit from the master cylinder through the threaded stud, through the duct 38 and into the hollow 39, through the chambers 42 and 43, the passages 64 and 65, the chambers 62 and 63, and the passages 66 and 67, and finally through the brake lines 20 and 21, and 22, 23, 24 and 25 to the brake actuating devices of the individual wheels. The braking system comprising the master cylinder, the safety device, the brake lines, and the brake actuating devices are normally completely filled with fluid. As is apparent, the front wheel brakes are controlled by the fluid in the left side of the safety device, namely in the chambers 42 and 62 and in the lines and passages connected therewith, and the rear wheel brakes are controlled by the fluid in the right side of the safety device, namely in the chambers 43 and 63 and in the passages and lines connected with these last mentioned chambers.

When the pedal 18 is depressed for applying the brakes, fluid is driven through the master cylinder, through the safety device into the brake lines, and into the brake actuating devices. In such application of the brakes the valve members 44 and 45 have been forced by the unusual pressure in the central region of the hollow 39 outwardly away from the valve seats 40 and 41 against the action of the springs 50 and 51, thus allowing fluid passage into the chambers 42 and 43. The pressure in the braking system when the brakes are applied is of the order of magnitude of sixty-five pounds per square inch, this pressure depending of course on the braking that is required by the driver.

When the pedal 18 is released, the brake actuating devices force the fluid back through the brake lines and safety device and into the master cylinder. In such operation of the brakes there is a pressure of fluid on the valve heads 54 and 55 which forces them away from valve members 44 and 45 against the action of the springs 58 and 59. Fluid then flows between the plungers 52 and 53 and the washer-like members 46 and 47 and through the perforations 60 and 61 in these members, and between the valve heads 54 and 55 and the valve members 44 and 45. The springs 58 and 59 are so adjusted that when the fluid pressure in the chambers 42 and 43 reaches seven pounds per square inch, they cause the valve heads to be brought back against the valve members, thus closing any opening between them. It is apparent then that the valve means comprising the valve members 44 and 45, the washer-like members 46 and 47, the valve heads 54 and 55, the shafts 52 and 53, the spring retaining heads 56 and 57, the springs 50, 51, 58, and 59, and the valve seats 40 and 41 function, when the brakes are in unapplied condition, to maintain the fluid pressure in the chambers 42 and 43 and from there outwardly to the brake actuating devices at a certain value, approximately seven pounds per square inch, and function to allow fluid flow through the valve means in both directions to and from the brake actuating devices. The pressure in the central region of the hollow 39 and in the duct 38 is also kept at this certain value by the valve means in the master cylinder.

Under normal conditions the fluid pressure in the chambers 62 and 63, which is seven pounds per square inch or above, keeps the plungers 70 and 71 down in their normal positions as shown in the figure against the action of the springs 78 and 79 with the lowermost portions of the rubber-like sleeves 72 and 73 across and below the terminations of the ducts 80 and 81 in the chambers 62 and 63. The plungers 70 and 71 are adapted to be kept in normal position by any fluid pressure in the chambers 62 and 63 above a predetermined value, in this case six pounds per square inch, this predetermined value being less than the fluid pressure normally maintained by the valve means in the chambers when the brakes are in unapplied condition.

When through accident or through long use a brake line, for example 24, is broken or becomes leaky, the pressure in the line and in the connected chambers 63 and 43 decreases until it is finally below the predetermined value. When this takes place the spring 79 forces the plunger 71 upwardly so that the sleeve 73 is no longer completely across the termination of the duct 81 in the chamber 63. Upon such movement, fluid is free to pass from the chamber 43 through the duct 81 and into the chamber 63 around the loosely fitting plunger therein. The fluid pressure on the bottom of the plunger is thus equalized with that on the top thereof, and the spring moves the plunger upwardly without any restraining force due to suction. Movement of the plunger continues until the tightly fitting sleeve 73 is across the passages 65 and 67, thus cutting off fluid flow through the passages.

When in such upward position the contact portion 75 of the plunger makes contact with the bottom of the stem 87 and completes an electric signalling circuit. The current flows from one side of the battery grounded at 32 through the end portion 35 of the safety device 19, which is grounded to the chassis through the master cylinder, through the plunger 71, across the contact between the contact portion 75 and the lower end of the stem 87, through the stem which is insulated by the cap 83 from the end casing portion, through the clip 95 and the lead 29 to the signal light 27 and finally through the lead 30 back to the battery.

In such case, with the line leading to one of the rear brakes broken or leaky, fluid flow to both rear brakes has been cut off, and they cannot be applied by movement of the pedal 18. This cutting off of fluid flow however does not affect operation of the front brakes, so a driver can depend on these for stopping the automobile. The warning light 27 is lighted when the plunger is in passage closing position thus apprising the vehicle driver of the condition of the braking system. The only fluid lost through the leak or break in the brake line is that fluid in the line between the safety device and the brake actuating device. Similar action takes place in regard to the plunger 70 and the warning light 26 if a leak or break should occur in any of the brake lines leading to the front brakes.

When either the front or the rear brakes have been cut off from the braking system as above described, it is advisable for the driver to have repairs made as soon as possible. The leaky or broken brake line, for example the brake line 24, is first replaced or repaired so that no fluid may be lost therefrom, and the stem 87 is screwed down against the plunger 71 until the plunger is driven back against the action of the spring 79 into normal position as shown in the figure. The brake lines leading to the rear brakes are then "bled," as is well known in the art, to remove all the air in the lines and to completely fill them with fluid. The stem 87 is then screwed back to normal position as shown in the figure and the system is again ready for normal operation. The system is repaired in the same manner by use of the stem 86 for forcing the plunger 70 back into normal position in case of a leak or break in any of the brake lines leading to the front brakes.

My improved safety device is reliable and effective for cutting off fluid flow to broken or leaky fluid lines and for giving a signal to the vehicle driver on such operative stroke. It is of simple and inexpensive construction, and it may be very easily installed on an otherwise completed automobile.

I wish it to be understood that my invention is not to be limited to the specific construction shown and described, except so far as the claims may be so limited as it will be apparent to those skilled in the art that changes may be made without departing from the principles of my invention.

I claim:

1. In a hydraulically operating braking system including a fluid displacement mechanism and a brake actuating device, the combination with a fluid conduit connecting the displacement mechanism with the brake actuating device, of valve means in said conduit adapted to allow the passage of fluid in both directions therethrough and to maintain the fluid pressure between the valve means and the brake actuating device above a predetermined value, a plunger in communication with the bore of said conduit at a point between said valve means and the brake actuating device, said plunger being slidable across the conduit bore and serving directly as the means for stopping fluid flow therethrough and normally held by the fluid pressure in such position that the bore is unobstructed thereby, and means adapted to move said plunger across the conduit bore upon a decrease of pressure on the plunger below said predetermined value.

2. In a hydraulically operating braking system including a fluid displacement mechanism and a brake actuating device, the combination with a fluid conduit connecting the displacement mechanism with the brake actuating device, of valve means in said conduit adapted to allow the passage of fluid in both directions therethrough and to maintain the fluid pressure between the valve means and the brake actuating device above a predetermined value, a hollow casing portion having a plunger slidably disposed therein and being in communication with said conduit at a point between said valve means and the brake actuating device, said plunger being slidable across the bore of said conduit and serving directly as the means for stopping fluid flow therethrough and normally held by the fluid pressure in such position that the bore is unobstructed thereby, and yielding means in said casing portion adapted to move said plunger across the conduit bore upon a decrease of pressure on the plunger below said predetermined value.

3. In a hydraulically operating braking system including a fluid displacement mechanism and a brake actuating device, the combination with a fluid conduit connecting the displacement mechanism with the brake actuating device, of valve means in said conduit adapted to allow the passage of fluid in both directions therethrough and to maintain the fluid pressure between the valve means and the brake actuating device above a predetermined value, a hollow casing portion having two fluid passages therein and being connected therewith in said fluid conduit between said valve means and the brake actuating device, a plunger in said casing portion having a sleeve of rubber-like material thereon, said plunger and sleeve being slidable in said casing portion until the sleeve is across one of said passages for stopping fluid flow through said conduit and normally held by the fluid pressure in such position that the passages are unobstructed by the sleeve, and yielding means in said casing portion adapted to move said plunger and sleeve into conduit closing position upon a decrease of pressure thereon below said predetermined value.

4. In a hydraulically operating braking system including a fluid displacement mechanism and a brake actuating device, the combination with a fluid conduit connecting the displacement mechanism with the brake actuating device, of valve means in said conduit adapted to allow the passage of fluid in both directions therethrough and to maintain the fluid pressure between the valve means and the brake actuating device above a predetermined value, a hollow casing portion having two fluid passages therein and being connected therewith in said fluid conduit between said valve means and the brake actuating device, a plunger loosely fitting in said casing portion having thereon a sleeve of rubber-like material tightly fitting in the casing portion, said plunger and sleeve being slidable in said casing portion until the sleeve is across one of said passages for stopping fluid flow through said conduit and normally held by the fluid pressure on the tops thereof in normal position with the passages unobstructed by the sleeve, yielding means in said casing portion adapted to move said plunger and sleeve upon a decrease of pressure thereon below said predetermined value until the sleeve is in conduit closing position, and a duct in said casing portion in communication with said conduit at a point between said valve means and the casing portion and terminating at a point adjacent the bottom of said sleeve in its normal position for the purpose described.

5. In a hydraulically operating braking system including a fluid displacement mechanism and a brake actuating device, the combination with a fluid conduit connecting the displacement mechanism with the brake actuating device, of valve means in said conduit adapted to allow the passage of fluid in both directions therethrough and to maintain the fluid pressure between the valve means and the brake actuating device above a predetermined value, a plunger in communication with the bore of said conduit at a point between said valve means and the brake actuating device, said plunger being slidable across the conduit bore and serving directly as the means for stopping fluid flow therethrough and normally held by the fluid pressure in such position that the bore is unobstructed thereby, contact means including a contact portion on said plunger and a stationary contact adapted to complete an electric signalling circuit when the plunger is in conduit closing position, and means adapted to move said plunger across the conduit bore upon a decrease of pressure on the plunger below said predetermined value.

6. In a hydraulically operating braking system including a fluid displacement mechanism and a brake actuating device, the combination with a fluid conduit connecting the displacement mechanism with the brake actuating device, of valve means in said conduit adapted to allow the passage of fluid in both directions therethrough and to maintain the fluid pressure between the valve means and the brake actuating device above a predetermined value, a hollow casing portion having a plunger slidably disposed therein and being in communication with said conduit at a point between said valve means and the brake actuating device, said plunger being slidable across the bore of said conduit and serving directly as the means for stopping fluid flow therethrough and normally held by the fluid pressure in such position that the bore is unobstructed thereby, contact means including a contact on said plunger and a contact held by said casing portion adapted to complete an electric signalling circuit when the plunger is in conduit closing position, and yielding means in said casing portion adapted to move said plunger across the conduit bore upon a decrease of pressure on the plunger below said predetermined value.

7. In a safety device for a fluid braking system, the combination of a casing member having a fluid conduit therethrough adapted to be connected at one of its outlet ports with the fluid displacement mechanism of a fluid braking system and at the other of its outlet ports with the brake actuating device of the braking system, valve means in said fluid conduit adapted to allow the passage of fluid in both directions therethrough and to maintain the fluid pressure therein between the valve means and said second named outlet port above a predetermined value, a plunger in said casing member in communication with said conduit at a point between said valve means and said second named port, said plunger being slidable across the conduit and serving directly as the means for stopping fluid flow therethrough and normally held by the fluid pressure in such position that the conduit is unobstructed thereby, and means in said casing member adapted to move said plunger across the conduit upon a decrease of pressure on the plunger below said predetermined value.

8. In a safety device for a fluid braking system, the combination of a casing member having a fluid conduit therethrough including a chamber and two passages connected with the chamber, valve means in said conduit adapted to be connected with the fluid displacement mechanism of a fluid braking system, said chamber being connected by one of said passages with said valve means and adapted to be connected by the other of said passages with the brake actuating device of the braking system, said valve means being adapted to allow the passage of fluid in both directions through said conduit and to maintain the fluid pressure in said chamber above a predetermined value, a plunger in said chamber slidable across one of said passages and serving directly as the means for stopping fluid flow through said conduit and normally held by fluid pressure in such position that the passages are unobstructed thereby, and yielding means in said chamber adapted to move said plunger across one of said passages upon a decrease of pressure on the plunger below said predetermined value.

9. In a safety device for a fluid braking system, the combination of a casing member having a fluid conduit therethrough comprising a chamber connected by means of a passage with a second chamber and a second passage leading from the second chamber, said second chamber being adapted to be connected by said second passage with the brake actuating device of a fluid braking system and said first named chamber being adapted to be connected with the fluid displacement mechanism of the braking system, a loosely fitting plunger in said second chamber having attached thereto a sleeve of rubber-like material tightly fitting in the chamber, valve means in said first named chamber adapted to allow fluid flow in both directions through said conduit and to maintain the fluid pressure in said second chamber above a predetermined value, said sleeve being slidable with movement of said plunger across one of said passages for stopping fluid flow through said conduit and normally held by the fluid pressure thereon and on the plunger in such position that the passages are unobstructed thereby, and yielding means in said second chamber adapted to move said sleeve and plunger into conduit closing position upon a decrease of pressure thereon below said predetermined value.

10. In a safety device for a fluid braking system, the combination of a casing member having a fluid conduit therethrough comprising a chamber connected by a passage with a second chamber and a second passage leading from the second chamber, said second chamber being adapted to be connected by said second passage with the brake actuating device of a fluid braking system and said first named chamber being adapted to be connected with the fluid displacement mechanism of the braking system, a loosely fitting plunger in said second chamber having attached thereto a sleeve of rubber-like material tightly fitting in the chamber, valve means in said first named chamber adapted to allow fluid flow in both directions through said conduit and to maintain the fluid pressure in said chambers above a predetermined value, said sleeve being slidable with movement of said plunger across one of said passages for stopping fluid flow through said conduit and normally held by the fluid pressure on its top end and on the top end of the plunger in normal position with the passages unobstructed by the sleeve, yielding means in said second chamber adapted to move the plunger and sleeve into conduit closing position upon a decrease of pressure thereon below said predetermined value, and a duct between said chambers terminating in said second chamber at a point adjacent the bottom of said sleeve in its normal position for the purpose described.

11. In a safety device for a fluid braking system, the combination of a casing member having a fluid conduit therethrough adapted to be connected at one of its outlet ports with the fluid displacement mechanism of a fluid braking system and at the other of its outlet ports with the brake actuating device of the braking system, valve means in said fluid conduit adapted to allow the passage of fluid in both directions therethrough and to maintain the fluid pressure therein between the valve means and said second named outlet port above a predetermined value, a plunger in said casing member in communication with said conduit at a point between said valve means and said second named port, said plunger being slidable across the conduit and serving directly as the means for stopping fluid flow therethrough and normally held by the fluid pressure in such position that the conduit is unobstructed thereby, contact means including a contact portion on said plunger and a stationary contact held by said casing member adapted to complete an electric signalling circuit when the plunger is in conduit closing position, and means in said casing member adapted to move said plunger across the conduit upon a decrease in pressure on the plunger below said predetermined value.

12. In a safety device for a fluid braking system, the combination of a casing member having a fluid conduit therethrough including a chamber and two passages connected with the chamber, valve means in said conduit adapted to be connected with the fluid displacement mechanism of a fluid braking system, said chamber being connected by one of said passages with said valve means and adapted to be connected by the other of said passages with the brake actuating device of the braking system, said valve means being adapted to allow the passage of fluid in both directions through said conduit and to maintain the fluid pressure in said chamber above a predetermined value, a plunger in said chamber slidable across one of said passages and serving directly as the means for stopping fluid flow through said conduit and normally held by the fluid pressure in such position that the passages are unobstructed thereby, contact means including a contact portion on said plunger and a stationary contact held by said casing member adapted to complete an electric signalling circuit when the plunger is in conduit closing position, and yielding means in said chamber adapted to move said plunger across one of said passages upon a decrease of pressure on the plunger below said predetermined value.

JOSEPH A. DERRIG.